(12) United States Patent
Boberg et al.

(10) Patent No.: US 8,898,744 B2
(45) Date of Patent: Nov. 25, 2014

(54) METHOD AND SYSTEM FOR AUTHORIZATION OF PRESENCE INFORMATION

(75) Inventors: Christer Boberg, Tungelsta (SE); Mikael Klein, Huddinge (SE); Anders Lindgren, Alvsjo (SE); Sofie Lassborn, Sollentuna (SE); David Cox, Melbourne (AU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 45 days.

(21) Appl. No.: 13/574,696

(22) PCT Filed: Jan. 27, 2010

(86) PCT No.: PCT/SE2010/050074
§ 371 (c)(1),
(2), (4) Date: Jul. 23, 2012

(87) PCT Pub. No.: WO2011/093754
PCT Pub. Date: Aug. 4, 2011

(65) Prior Publication Data
US 2012/0304252 A1 Nov. 29, 2012

(51) Int. Cl.
*H04L 29/06* (2006.01)
*H04L 29/08* (2006.01)

(52) U.S. Cl.
CPC .............. *H04L 67/24* (2013.01); *H04L 63/105* (2013.01)
USPC .................................. 726/4; 726/17; 726/27

(58) Field of Classification Search
CPC ... H04L 67/24; H04L 63/105; H04L 63/0884; H04W 12/00
See application file for complete search history.

(56) References Cited

U.S. PATENT DOCUMENTS

| 2008/0125157 | A1* | 5/2008 | Zhang ........................... 455/518 |
| 2008/0240384 | A1 | 10/2008 | Suryanarayana et al. |
| 2009/0320094 | A1* | 12/2009 | Kiss ................................. 726/1 |

FOREIGN PATENT DOCUMENTS

| EP | 1549013 A1 | 6/2005 |
| JP | 2005-309500 A | 4/2005 |
| WO | WO 2009/097902 A1 | 8/2009 |

* cited by examiner

*Primary Examiner* — Izunna Okeke

(57) ABSTRACT

Embodiments of the present invention include a system and method for implementing a presence system. According to an embodiment of the present invention, responsive to receiving a request for presence information associated with a presentity from a watcher, the presence system receives instructions indicating that an authorization instance other than the presentity shall be given an opportunity to change or verify an authorization rule associated with the request for presence information. As a consequence, the presence system notifies the authorization instance of the request for presence information, thereby enabling the authorization instance to change or verify the authorization rule. The presence system also makes a final decision on the authorization rule on the basis of the instructions and a notification indicating a change or verification of the authorization rule.

23 Claims, 7 Drawing Sheets

METHOD AND SYSTEM FOR AUTHORIZATION OF PRESENCE INFORMATION

TECHNICAL FIELD

The present invention relates to the field of authorizing a Watcher who has requested for Presence information subscription and to a Presence system adapted to perform such an authorization process.

BACKGROUND ART

Presence services represents a group of well known network services which may be applied in various types of wireless and stationary communications networks for the main purpose of distributing information associated with a first user, typically referred to as a Presentity, to one or more other users, typically referred to as Watchers, on the condition that the Presentity is first authorizing the Watchers access to the requested Presence information. Throughout this document a Presentity, as well as a Watcher, are to be referred to as a respective user and an associated users equipment, where the user equipment is configured to provide Presence services by accessing a presence enabled communications network.

A presence service typically allows a Watcher to be informed about different states of a Presentity, such as e.g. the reachability, availability, and/or the willingness of the Presentity to communicate with other users. The presence service may also be used to indicate whether the Presentity is presently online or not and while being online, possibly also whether the Presentity is idle or busy. In addition, the presence service may give an authorized Watcher access to details of communication means and the respective capabilities of each communication means to which the Presentity is registered.

The Internet Engineering TaskForce (IETF) SIP Instant Messaging and Presence Leveraging Extensions (SIMPLE) technology is a technology which is describing one type of known Presence enabled application which is built on top of the SIP event notification framework, and which is suitable for use by different industry forums, such as e.g. Open Mobile Alliance (OMA), and the $3^{rd}$ Generation Partnership Project (3GPP).

FIG. 1 is an illustration of a simplified scenario of a SIMPLE based Presence system 100 which is configured to provide Presence information about a Presentity P to a Watcher W, according to the prior art. The Presence system 100 comprise a Presence Server (PS) 101 and a Presence Server XML Document Management Server (PS XDMS) 102. As is well known in the art, PS XDMS may be configured as a function integrated with the PS, or as a separate function, interconnected with the PS.

In order to be able to allow or deny Watcher W access to its Presence information, Presentity P needs to make sure that it is updated with relevant Presence related information from PS 101, i.e. whenever an event of interest for the Presentity occurs. Therefore, Presentity P initially transmit a request to PS 101 to subscribe for relevant update information, in the present case its own Watcher information (W info), as indicated with a first step 1:1.

In another step 1:2, Watcher W, wanting to subscribe for Presence information associated with Presentity P, transmit a request to Presence Server 101, requesting for a such a subscription. PS 101 responds to the request by acquiring the authorization rules of Presentity P from PS XDMS 102, as indicated with another step 1:3. If the authorization rules comprises a rule which is valid for the request of step 1:2, PS 101 notifies Presentity P of the request, which makes a decision on whether or not to authorize the request and transmit the decision to PS XDMS 102, as indicated with another step 1:5. PS XDMS 102 then notifies PS 101 of the decision, i.e. of the updating of the authentication rule, in a step 1:6, and PS 101 notifies Watcher W of the decision in another step 1:7, after which PS 101 will be able to distribute relevant Presence information to Watcher W, in case the request was allowed by Presentity P in step 1:5.

The authorization model described above is based on the fact that the user which has the authorization responsibility also has the authority to actually perform the authorization. There are however situations when such a structure is not the most suitable one. One such situation may be e.g. when the Presentity is under aged. Another situation may be when the Presence information is associated with a plurality of Presentities.

SUMMARY OF INVENTION

It object of the present invention to address at least the problem mentioned above. More specifically, it is an object of the present invention to provide a more dynamic authorization method which does not rely only on the Presentity as being the only entity which is entitled to authorize a Watcher wanting to subscribe for Presence information. The present invention also refers to a Presence system which is configured to perform the suggested method.

The suggested method enables an administrator of a Presence service to define one or more authorization entities other than the Presentity, alone or in combination with the Presentity, to participate in the authorization process in a pre-defined order. Thereby, the security aspects associated with distribution of Presence information may be improved. The suggested method makes it possible to introduce e.g. a parental control function for Presence, where parents or other parties having a higher authorization priority than the Presentity may be included as a verifying instance in the authorization process, such that a request for subscription of Presentity information associated with a certain Presentity will only be allowed if the verifying instance/es approves.

The objects mentioned above, as well as other related objects, can be obtained by providing a method and a Presence System, according to the independent claims of this document.

According to one aspect, a method for authorizing a Watcher (W) to access Presence information associated with a Presentity (P), to be applied in a Presence system is provided.

The authorization method is triggered by the reception of a request for Presence information associated with a Presentity from a Watcher (W). In response to receiving such a request, the Presence system acquires instructions which are indicating that an authorization instance (C) other then the Presentity (P) shall be given an opportunity to set change or verify an authorization rule associated with the request for presence information. At this stage an authorization rule may already have been set and stored at the Presence system, or it may have to be set by the authorization instance.

According to the instructions, the Presence system notifies the authorization instance (C) of the request for presence information, in order to allow the authorization instance (C) to set, change or verify the authorization rule. After having notified the authorization instance (C), the Presence system can make a final decision on the authorization rule on the basis of the instructions and a notification indicating a setting, change or verification of the authorization rule, in case such a notification is received from the authorization instance, or on the basis of a default authorization rule of the instructions, in case no such notification is received.

According to an alternative embodiment the step of notifying an authorization instance may be repeated for at least one additional authorization instance (D,E) other than Presentity (P) according to the instructions, before executing a final decision on the authorization is made.

If more than one authorization instance is participating in the authorization process, the order of authorization instances (C, D, E) may be determined on the basis of an authority list being included in the instructions, such that the authorization instance (C, D, E) being appointed the highest authority is the one which is notified first.

Since a notified authorization instance (C, D, E, P) may decide not to participate in the authorization process, the Presence system may need some type of controlling mechanism, which allows it to continue with the authorization process. Such a mechanism may be obtained by introducing a timer function into the Presence system. Once a notification has been transmitted to an authorization instance (C, D, E, P), a timer which is associated with the authorization instance is started.

The step of notifying an authorization instance may the n be repeated for another authorization instance (D, E, P) in case a notification of a set, changed or verified authorization rule is received in response to the notification of the authorization instance (C, D, E, P) prior to timeout of the timer or upon timeout of the timer.

By applying the timer, the Presence system will be able to run a controllable process where a series of authorization instances may be sequentially notified until the authorization instance (C, D, E, P) having the highest authority has responded to a corresponding notification or the timer associated with this authorization instance has timed out.

The instructions to be use during authorization may be defined in the presence rules of the Presence System, or may be configured as a separate document.

The notification which is sent to the authorization instance to inform it that a Watcher is requesting to subscribe for Presence information typically comprise an indication that Watcher (W) is requesting Presence information associated with Presentity (P) and information about what kind of Presence information Watcher (W) is requesting.

During the authorization process, a notified authorization instance will have to be able to identify the Watcher and the presentity. These identities may be included in the To header, the From header or in the notification body of the notification. Alternatively, these identities may be included in a new, dedicated identity header of the notification.

In order for an authorization instance to notified of a request for presence information and a Watcher to be authorized, the authorization instance may request to subscribe for Watcher information or updates of the authorization rule. Watcher information may be subscribed for e.g. by submitting a Watcher Info NOTIFY message to the Presence system, while updates of authorization rules may be subscribed for e.g. by submitting an XCAP Changes NOTIFY message to the Presence system. Alternatively, filtered information may be subscribed for, e.g. such that only changes of an authorization rule which are relevant for the authorization process according to the applicable instructions will be received. Thereby, the amount of notifications may be limited.

In order to assure that only authorization instances which are authorized to set, verify and update an authorization rule are notified, the Presence system may also be configured to determine whether an authorization instance is authorized in the stage a subscription request is received from the authorization instance. Alternatively, such a determination may be performed prior to the notification. The determination is typically performed on the basis of the access rules of the Presentity.

According to another aspect, a Presence System which is suitable for executing the method described above is suggested. The Presence system typically comprises a Presence Server and a PS XDMS function, which is either integrated with the Presence Server or configured as a separate entity which is interacting with the Presence server.

The Presence system comprises a communication unit for receiving a request for said Presence information from the Watcher (W) and an authorizing unit for acquiring instructions indicating that an authorization instance (C) other then the Presentity (P) shall be given an opportunity to set, change or verify an authorization rule associated with the request for presence information. The Presence system also comprises a notifying unit for notifying the authorization instance (C) of the request for presence information, thereby enabling the authorization instance (C) to set, change or verify the authorization rule.

The authorizing unit is further configured to make a final decision on the authorization rule on the basis of the instructions and a notification indicating a setting change or a verification of the authorization rule, in case such a notification is received from the authorization instance (C), or on the basis of a default authorization rule of the instructions, in case no such notification is received.

The Presence system may also be provided with a timer unit. In such a case the authorization unit may be further configured to start a timer upon instructing the notification instance to notify the authorization instance (C, D, E, P), and to, according to the instructions, take the final decision or to instruct the notification unit to notify another authorization instance and to start another associated timer in case a notification of a set, changed or verified authorization rule is received by the communication unit in response to the notification of the authorization instance (C, D, E), prior to or upon time-out of the timer.

The notification unit is typically configured to add to a notification which is sent to an authorization instance at least an indication indicating that Watcher (W) is requesting Presence information associated with Presentity (P) and information about what kind of Presence information Watcher (W) is requesting. The notification unit will also be configured to add the identities of the Watcher (W) and the Presentity (P). Therefore the notification unit may be configured to add these identities in the To header, the From header or the notification body of the notification.

For the purpose of providing notifications only to authorization instances which are entitled to participate in the suggested authorization process the authorization unit may be further configured to receive a request for subscribing for Watcher information or updates of the authorization rule from authorization instances (C, D, E, P), wherein in response to such a request, the authorization unit is configured to check the authorization, e.g. by interrogating the access rules of Presentity (P), and to only notify authorization instances which are found to be authorized. Alternatively, the authorization unit may be configured to check the authority upon notification.

Further features and benefits of the present invention can be understood from the detailed description following below.

BRIEF DESCRIPTION OF DRAWINGS

The invention will now be described, by way of example, with reference to the accompanying drawings, in which.

DESCRIPTION OF EMBODIMENTS

Figure 1:
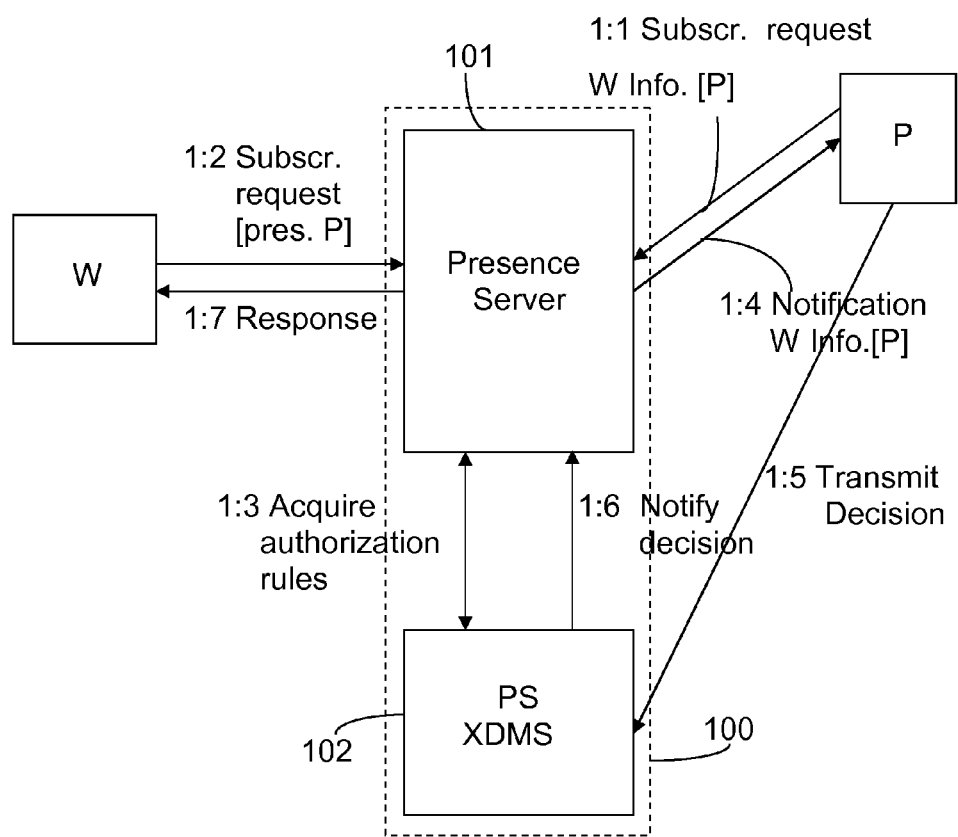
FIG. 1 is an illustration of a scenario for authorizing a Watcher requesting for Presence information associated with a Presentity, according to the prior art.

The present document refers to a method which allows a user, or an authorization instance, other than the Presentity, from hereinafter also referred to as a 3rd party authorization instance, to update an authorization rule, i.e. to set, change or verify an authorization rule of the Presentity which rule is associated with a Watcher requesting to subscribe for Presence information associated with Presentity P, or to verify the authorization rule when is has already been specified by another authorization instance, which may either be the Presentity itself or another authorization instance.

From hereinafter an authorization instance is to be referred to as a user which is authorized to participate in a process for authorizing a Watcher requesting to subscribe for Presence information, and a user device to which the user is registered. The user device may be any type of Presence services enabled wireless or stationary user device, i.e. a user device which is configured to access a Presence system.

Which authorization instance or instances that is/are allowed to participate in the authorization process, as well as the order in which different authorization instances are to be allowed to participate in the authorization procedure, in case more than one authorization instance is to be included in the authorization process will be determined on the basis of pre-defined authorization instructions, from hereinafter refereed as instructions. In a typical scenario the instructions applicable for a specific request for Presence information depends on the Watcher and the Presentity. The instructions may constitute an extended part of the authorization document of Presentity P, or be configured as a separate document. The instructions may be specified on a permanent basis or may be of a more dynamic nature, such that the instructions depend on criteria such as e.g. the time of the day or amount of presence related traffic.

A method of a Presence System for authorizing a Watcher to access Presence information associated with a Presentity according to the general principles mentioned above will now be described in more detail below with reference to the flow chart of FIG. 2.

As a prerequisite it is assumed that the Presentity and each authorization instance have requested to subscribe for Presence related updates which will serve as a trigger to indicate to a potential authorization instance that it is expected to make an authorization decision on a specific request. Such a request may e.g. be a request for updates of the Presentities Watcher info, or for selected parts of the Watcher info, i.e. Watcher info. which has been filtered according to the request.

Watcher info may be provided to the authorization instance as Watcher info notifications. Alternatively, a Watcher may choose to request to subscribe only for updates of subscription rules, by requesting for XCAP Changes notifications associated with the Presentity. Also when subscribing for updates on subscription rules, such a subscription may be restricted e.g. to updates of an authorization rule which refer to changes from "Allowing" to "Hocking" or vice versa. Filtered subscription requests may be preferred for the reason to limit the number of notifications provided to an authorization instance, such that only notifications of relevant importance to the authorization instance are provided to it.

Figure 2:
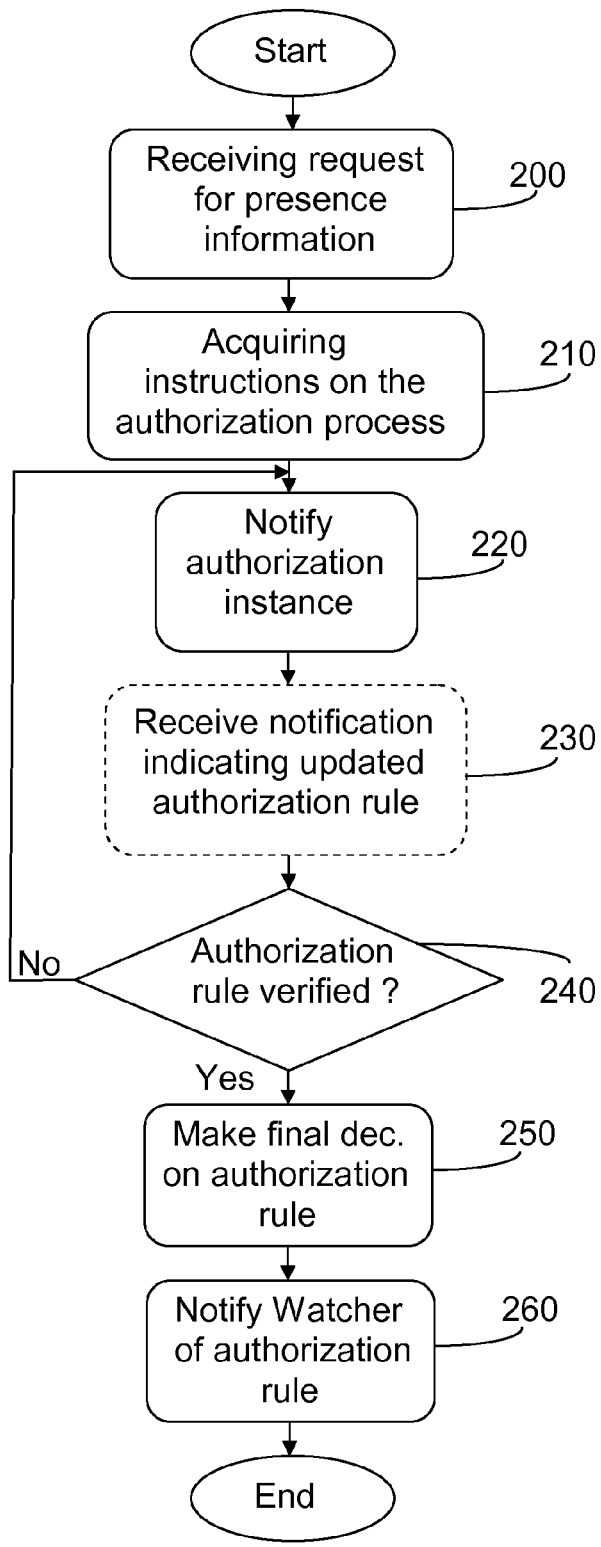
FIG. 2 is a flow chart illustrating a method for enabling an authorizing instance other than the Presentity to participate in an authorization procedure for authorizing a Watcher requesting for access to Presence information of a Presentity, according to one exemplary embodiment.

In a first step 200 of FIG. 2, a request for Presence information associated with a Presentity is received from a Watcher. The request indicates that Watcher W is requesting to subscribe for Presence information associated with Presentity P, and what type of Presence information that Watcher W is interested to retrieve. The request also comprises the identities of Watcher W and Presentity P. In response to receiving such a request, the Presence Server acquires pre-defined instructions on the conditions to be applied when authorizing the received request, as indicated with a next step 210. In a typical scenario the instructions are stored in, and accessible from the PS XDMS, but alternatively the relevant instructions may be stored at the PS.

According to conventional authorization procedures an authorization of a request for Presence information is performed on the basis of an authorization rule, which is applicable for a respective Presentity and subscription request. Once set an authorization rule indicates whether an associated Watchers subscription request is to be allowed or denied/blocked, i.e. whether the requesting Watcher will have the requested Presence information delivered, or if he will be denied access to the requested presence information. The instructions instructs the PS on how to come to a final authorization decision on the received request.

By introducing the suggested instructions one or more authorization instances, other than the Presentity, will be given an opportunity to change an authorization rule which has already been set, or to verify the authorization rule associated with the request for presence information.

The instructions will typically comprise specific instructions for the situation where no applicable authorization rule exist for a respective Watcher and the received request, and/or in case one or more authorization instances other than the conventional entity, i.e. the Presentity, has to be given an opportunity to participate in the authorization process, before a final authorization decision can be made by the Presence Server. The instructions will typically also comprise default instructions or decisions to be used in a final decision, in case one or more authorization instances which are allowed to participate in an authorization process of a particular request, has not changed or verified an authorization rule.

By way of example a request for presence information associated with Presentity Alice may, according to the pre-defined instructions, require a verification from at least two additional authorization instances, such as e.g. at least one of her parents. If none of her parents are available to allow the request, the authorization rule may by default be set to Block, i.e. the requested subscription is denied.

According to another example, a Watcher may only be authorized if a majority of a plurality of authorization instances have allowed a request. In case of such a condition, a default condition should state that the request should be blocked in case not enough authorization instances responds to their respective notifications.

At this stage the Presence Server may also be able to verify whether or not an authorization instance is entitled to update a respective authorization rule, by acquiring the access rules applicable for the Presentity. Alternatively the presence rules may have been consulted already in association with receiving the request from the Watcher. In any case, if it is found that an authorization Instance is entitled to update the authorization rule this is also an indication to the PS that that it can notify the authorization instance.

Ata next step 220 the PS notifies the authorization instance, e.g. by providing Watcher info or other corresponding information to the authorization instance.

Subsequent to receiving the notification the authorization instance may make a decision on the subscription request by forwarding such a notification, e.g. in the form of an XCAP PUT which is sent to PS XDMS PS XDMS responds to such a notification by notifying PS of the update/change of the authorization rule, as indicated with an optional step 230.

On the basis of the notification indicating the change of the authorization rule, or of an applicable default instruction applicable for the authorization rule, it is then determined whether the present content of the authorization rule can be considered as verified by the authorized authorization instance/s, such that a final authorization decision can be made by PS, or if one or more additional authorization instances is/are to be notified before a final decision can be made. This conditional step is indicated with step 240 in FIG. 2, while a final decision is taken in step 250.

On the basis of the updated authorization rule the next step in the authorization process can be identified from the instructions in step 240. An authorization instance may, however, dispense with participating in the authorization process, e.g. by deliberately leaving the authorization decision to another party, or for the reason of being indisposed.

In a typical scenario also the Presentity will be involved in the authorization process, and such a decision may be given either at an early stage, prior to the verification by an authorization instance other than the Presentity, or after the Presentity, has updated the authorization rule. In case it is determined in step 240 that the authorization rule as updated by the authorization instance other than the Presentity cannot yet be verified, the process of notifying another authorization instance, in order to give this instance an opportunity to either change a decision and, thus to update the authorization rule, or to approve with a decision, is repeated from step 220, as indicated in FIG. 2.

For the event that an authorization instance does not update an authorization rule, step 220 may include the use of a timer, such that a timer is started in association with sending a notification to an authorization instance. If no notification is received in response prior to timing out of the timer, the authorization process is continued according to the next stage in the instructions in step 240. IF, on the other hand, a notification is received prior to time-out, the notification is treated accordingly in step 240. Steps 220-240 may be repeated for one or more authorization instances, depending on the instructions.

Fit is instead determined in step 250 that a final decision can be made, PS notifies the Watcher of the authorization rule, as indicated with another step 260, and the authorization process is terminated. If the Watcher was authorized in step 250 PS may from this stage provide relevant Presence information to the Watcher according to conventional Presence distribution procedures.

As already mentioned above, steps 220 to 240 may be repeated for at least one additional authorization instance other than the presentity, before steps 260 and 270 are executed. Such a scenario may e.g. be applicable in case at least one of authorization instances other than the presentity has to verify an authorization rule in order to end up in a final positive decision, i.e. the authorization rule set to "Allow". Alternatively an allowance from all, or a majority of a plurality of authorization instances may be required.

According to a first embodiment, steps 220 to 240 may first be executed for the Presentity being the authorization instance, before the same steps are executed for one or more authorization instances other than the Presentity (P). In this scenario an update/decision made by the Presentity is verified by an authorization instance other than the Presentity, which typically will have a higher priority that the Presentity and thus the authority to agree with a decision given by an earlier authorization instance or to change such a decision, irrespective of the decision made by the Presentity.

According to another embodiment, steps 220 to 240 may instead be repeated with the Presentity as authorization instance after one or more authorization instances other than the Presentity has/have been notified and given an opportunity to update the authorization rule. In this scenario the Presentity verifies a decision given by another authorization instance, and may typically only have the authority to refuse a decision or approve with a previous decision to allow the request, while a decision to refuse the request cannot be changed to a decision to allow by Presentity, since the Presentity will typically have lower priority.

The method described above may be applied according to a number of different embodiments. Below three different ways of implementing the suggested authorization method will be described with reference to FIGS. 3a-3c, respectively. Even though the given examples are based on the Internet Engineering TaskForce (IETF) SIP for Instant Messaging and Presence Leveraging Extensions (SIMPLE) based Presence, it is to be understood that the suggested method may be used also in Presence systems which are based on other Presence enabled standards or protocols, such as e.g. Open Mobile Alliance (OMA), 3rd Generation Partnership Project (3GPP), Rich Communication Suite (RCS), or Extension Messaging and Presence Protocol (XMPP).

An authorization process according to a first embodiment, where only an authorization instance (C) other than the Presentity (P) is participating in the authorization of Watcher (W) to access Presence information associated with Presentity (P), will now be described in more detail with reference to FIG. 3a.

As a prerequisite, authorization instance C, and Presentity P are subscribing for Presentity P's Watcher info, as indicated with steps 3:1a and 3:1b, respectively, such that authorization instance C will be notified whenever Watcher W requests to subscribe for Presence information associated with Presentity P which triggers C as a relevant authorization instance, enabling authorization instance C to participate on the authorization.

In a next step 3:2 PS 300 is receiving a request for Presence information associated with Presentity P from Watcher W. In response to such a request, PS 300 acquires instructions which are applicable for Presentity P from the PS XDMS 301 of Presentity P. Alternatively, the instructions may be acquired from a storage means of PS 300. On the basis of the instructions PS 300 determines in the present case that no authorization rule for Watcher W exists, and accordingly it is determined from the instructions that authorization instance C and not the Presentity P is to authorize the request of Watcher W.

PS 300 notifies authorization instance C of the expected authorization task, as indicated with another step 3:4. In the present example authorization instance C decides to allow the subscription request of Watcher W, by setting or updating the respective authorization rule in PS XDMS 301, as indicated with a next step 3:5, typically by transmitting an XCAP PUT to PS XDMS 301. In response to the update of the authorization rule decided by C, PS XDMS 301 transmit an update notification to PS 300, as indicated with another step 3:6.

The authorization process is now completed and PS 300 may notify Presentity P of the decision/update in another step 3:7a, however, without allowing Presentity P to have any influence on the decision. Watcher W can then be made aware of the decision/update in another step 3:7b. Alternatively Presentity P may be informed of the authorization rule update, i.e. the decision made by authorization instance C via a notification, such as e.g. an XCAP Changes SIP NOTIFY provided from PS XDMS. In the latter case, Presentity P should have requested for a subscription of XCAP changes in step 3:1b instead of W info.

Another authorization process, where a plurality of authorization instances, here including the Presentity P and a third party entity C, are involved in the authorization process will now be described in further detail with reference to FIG. 3b.

According to this embodiment, the instructions may state a certain order in which authorization instances are to be notified, starting with the authorization instance which has been given the highest authority. In the present example authorization instance C has highest authority, and accordingly, the initial steps 4:1a-4:6 corresponds to the first steps of the embodiment described above, with reference to FIG. 1, i.e. authorization instance C is first notified of the request and given the opportunity to authorize the request and Watcher W.

Depending on the decision made by authorization instance C PS 300 may decide to verify the authorization rule or to notify Presentity P, thereby enabling also P to make a decision, i.e. to set or update the authorization rule, although with restricted authority. IF the request is blocked by authorization instance C, being the authorization instance with the highest authority, the opinion of Presentity P will be irrelevant, and, thus, PS 300 can verify the decision made by authorization instance C as a final decision an notify Watcher W and Presentity P of the denial of the request, as indicated with steps 4:7 and 4:10, respectively. In case of denial steps 4:8 and 4:9 will not be executed.

If, on the other hand the request is not blocked by C, as indicated in the example in the figure, Presentity P is notified of the update of the authorization rule in step 4:7, and is given the opportunity to either block, i.e. update the authorization rule, or accept the request, by verifying the authorization rule as updated by authorization instance C. This is done in step 4:8, while an update is notified to PS 300 in step 4:9. In the present case the instructions now specifies that all authorization instances to be notified for the respective request have been notified, and that a final decision can be made by PS 300 and forwarded to Watcher W, as indicated with step 4:10.

According to yet another alternative embodiment, an authorization decision taken by the Presentity will have to be granted by a third party authorization instance before a final decision can be made, while if not granted by the third party authorization, the request will be denied. This alternative embodiment will now be described in further detail with reference to FIG. 3c.

In resemblance to the earlier embodiments the authorization instances which are to be involved in authorization procedures associated with a specific Presentity first makes preparations for being able to be updated with Presence related information associated with the Presentity. In FIG. 3c this is achieved by the third party authorization instance C, requesting an XCAP Changes subscription, as indicated with another step 5:1a and the Presentity, requesting a subscription for W info, as indicated with step 5:1b. Alternatively, Presentity P may instead subscribe for XCAP changes from PS XDMS 301. It is also assumed that both these subscription requests are allowed by PS 300.

In a next step 5:2 a subscription request for Presence information associated with Presentity P is received from Watcher W, which results in that PS 300 acquires instructions for how to handle the authorization process for the request from PS XDMS 301, as indicated with step 5:3. PS 300 follows the instructions, which in the present case indicates that the Presentity P is to be given a first opportunity to decide on whether the request received in step 5:2 is to be allowed or blocked, and that once Presentity P has decided on the authorization authorization instance C is to be given an opportunity to verify the decision. More specifically, authorization instance C will always be the instance which determines the final outcome of the authorization.

Consequently, the Presentity P is notified of the request with a W info. notification as indicated in step 5:4. In response to the notification, Presentity P may choose to make a decision as to the authorization of the request by setting or updating the authorization rule and transmitting the result to the PS XDMS 301, typically by sending an XCAP PUT to PS XDMS 301. In FIG. 3c such a decision is indicated with step 5:5. At the PS XDMS 301 the decision is registered, i.e. the relevant authorization rule is updated accordingly, and as a result, PS XDMS 301 generates an XCAP Changes notification which is transmitted to authorization instance C, subscribing to XCAP changes, as indicated with a subsequent step 5:6. Although not indicated in the figure, the authorization rule update in step 5:5 may also result in a notification being sent to PS 300, corresponding to step 4:9 is FIG. 3b.

As already mentioned above, it is to be understood that in association with the subscription request 5:1a, authorization instance C may have chosen to subscribe e.g. only to authorization rule changes to allow. In such a case PS XDMS 301 will only provide an XCAP Changes notification to authorization instance C if such a change is registered at PS XDMS 301.

In the present example authorization instance C makes a decision, as indicated with step 5:7. PS XDMS 301 responds by, according to the subscription initiated in step 5:1a, notify PS 300 of the authorization rule update, as indicated with another step 5:8. Although not indicated in the figure Presentity P may also be notified of the decision, via a W info. Notification, corresponding to step 4:7 in FIG. 3b. From the instructions PS 300 may at this stage be aware of that the latest decision is decisive for the authorization, and, thus, that a final decision can now be made. The result of such a final decision is typically transmitted to Watcher W as indicated with step 5:9. The authorization procedure is now completed and relevant Presence information can be delivered to Watcher W from PS 300 whenever appropriate.

Figure 3A:
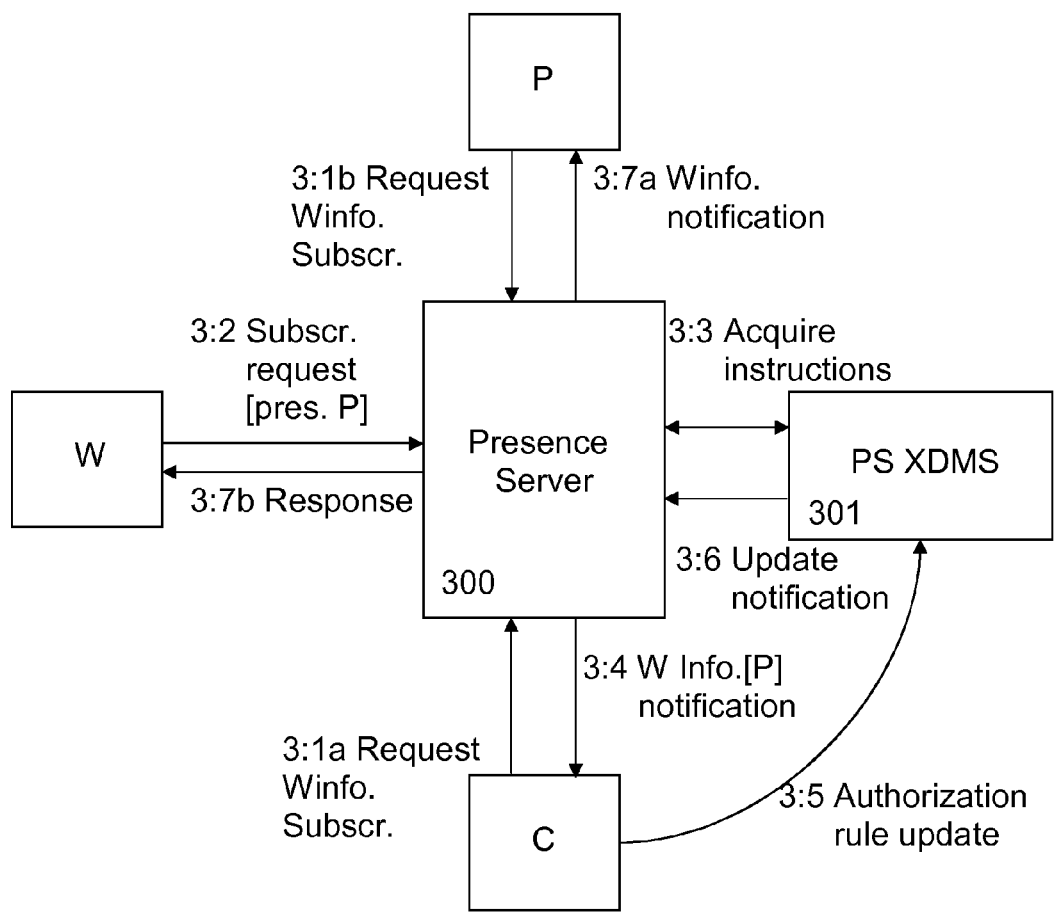
FIG. 3a is an illustration of a scenario according to one embodiment where an authorization decision is taken by an authorization instance other than the Presentity.
Figure 3B:
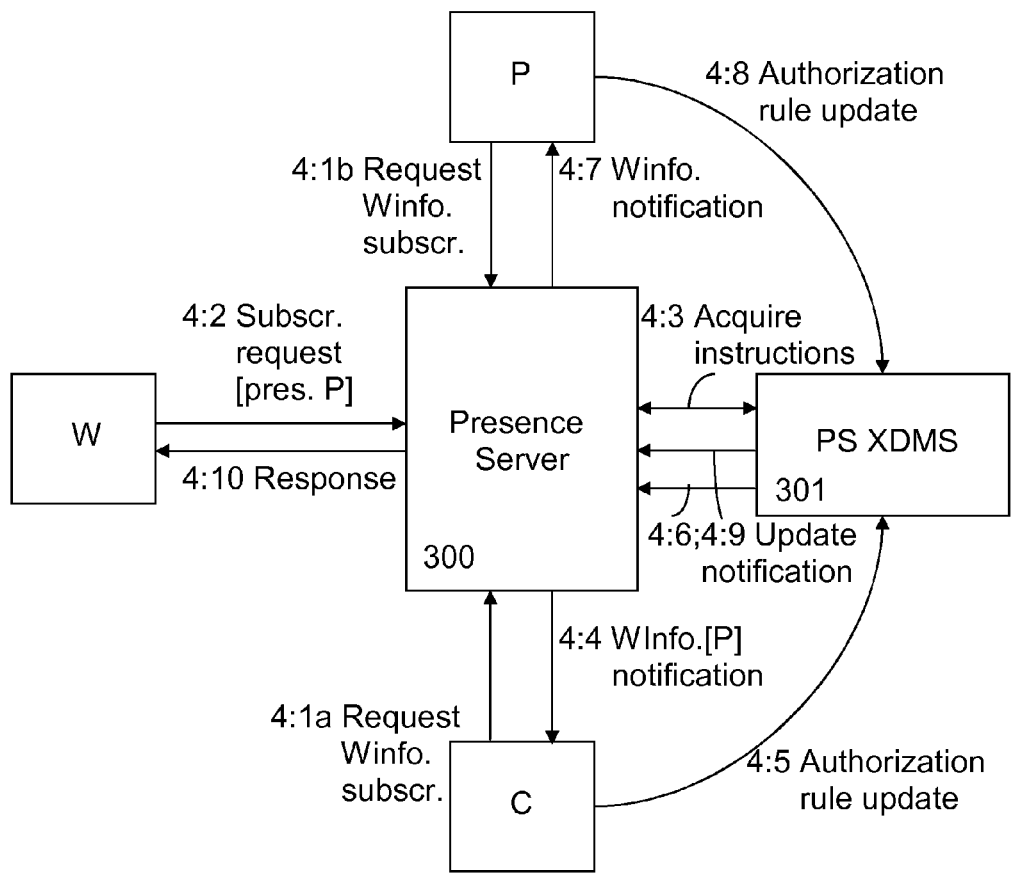
FIG. 3b is an illustration of a scenario according to another embodiment where an authorization decision is taken after having involved more than one authorization instance.
Figure 3C:
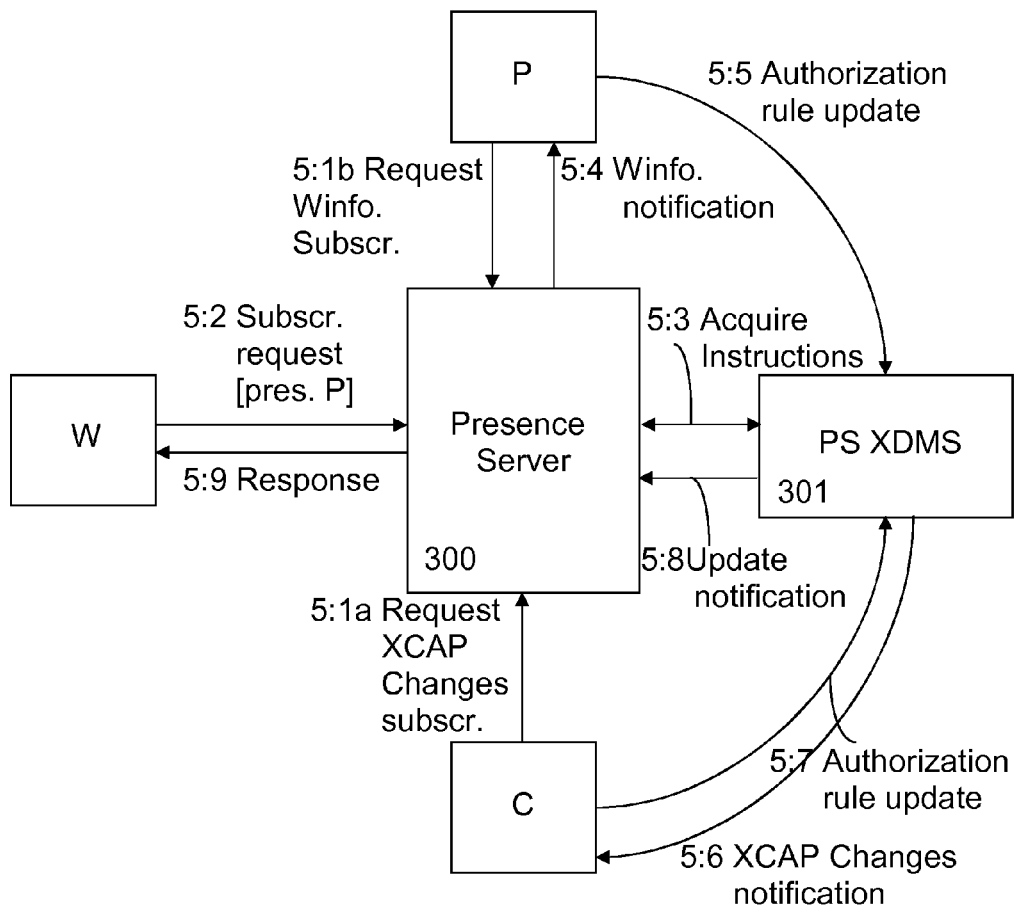
FIG. 3c is an illustration of a scenario according to a third embodiment where an authorization decision taken by the Presentity has to be verified by another authorization instance.

It is to be understood that even though the PS 300 and PS XDMS 301 have been illustrated as separate entities in FIGS. 3a to 3c, these entities may alternatively be configured as one single entity. It is also to be understood that the described scenarios are simplified illustrations of possible ways of executing the suggested authorization method, and that steps which are normally executed in a conventional Presence process, but which are not necessary for the understanding of the suggested method have been omitted for simplicity reasons.

In order to be able to apply the suggested authorization method, the PS 300 of the Presence system will have to be adapted accordingly, while the PS XDMS 301 functionality may be configured according to conventional procedures. The same applies to the naming of the suggested functional unit, where the described generic functions which have been named with the main purpose of simplifying the understanding of the suggested authorization mechanism.

Figure 4:
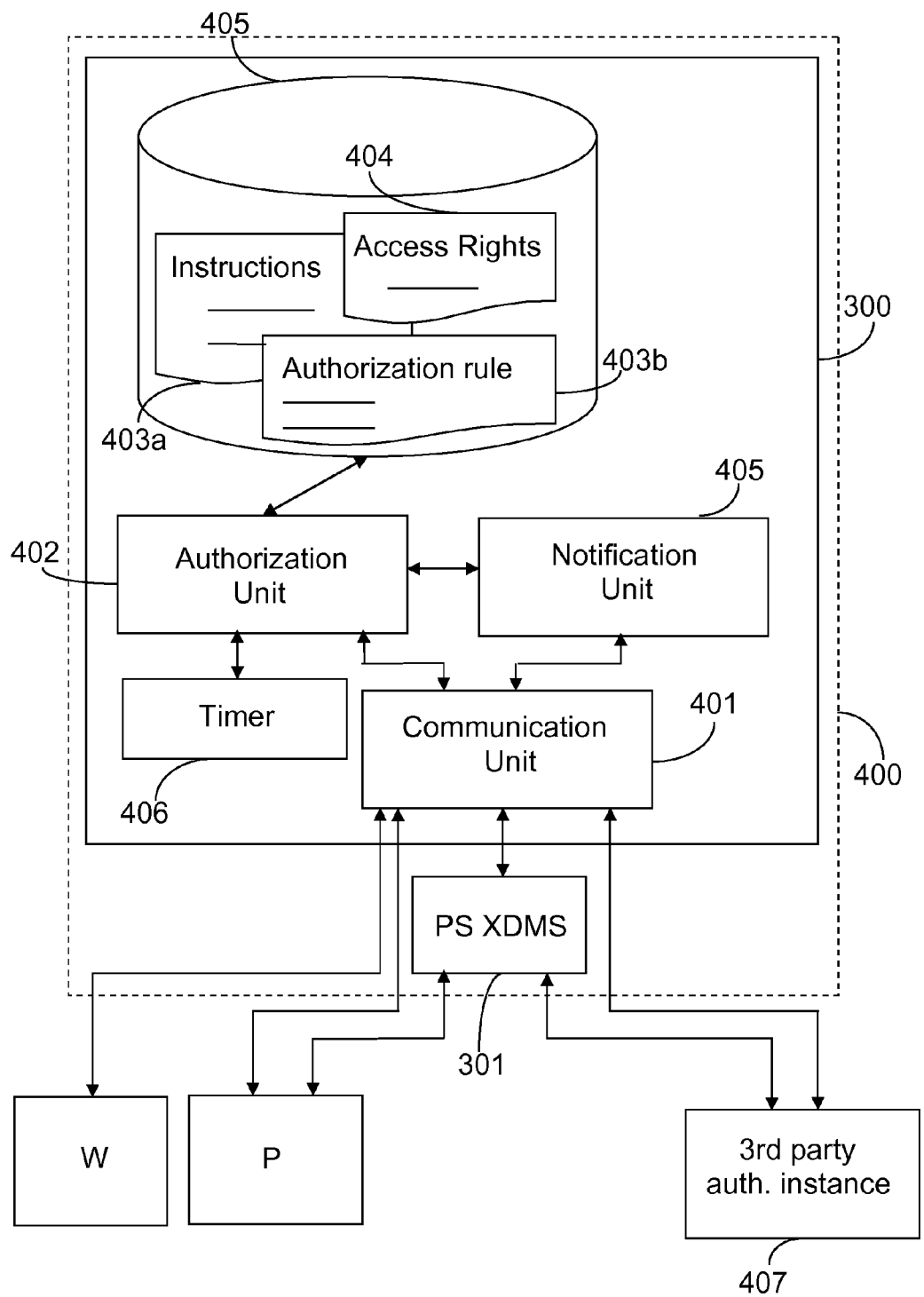
FIG. 4 is a simplified block scheme illustrating an exemplified Presence system which is suitable for executing the authorization method suggested with reference to any of FIGS. 2-3c.

FIG. 4 is a simplified block scheme of a Presence system 400 comprising a PS 300 PS XDMS functionality 301, which has been configured to execute the method according to any of the embodiments above. It is to be understood that the invention is not limited to Presence systems as illustrated in FIG. 4. Instead a Presence system may comprise other functional entities which are configured and interconnected such that the suggested method steps can be executed. As indicated with the dotted lines of FIG. 4, the PS XDMS function 301 may be configured as an integrated part of the PS 300, or as a separate entity, interconnected with PS 300. Procedures for exchanging information between a PS and a PS XDMS in association with authorizing and executing presence related services are commonly know in the art, and thus any step which may normally be executed in Presence systems but which are not necessary for the understanding of the suggested authorization mechanism have been omitted for simplicity reasons. In addition, even though a Presence Server normally comprises a number of additional functional units, only units which are necessary for the understanding of the suggested authorization mechanism are described, while other possible units have been omitted for simplicity reasons.

The PS 300 of FIG. 4 comprises a Communication Unit 401 which is configured to receive a request for presence information of a Presentity (P) from a Watcher (W), according to conventional procedures. An Authorization Unit 402 connected to the communication unit 401 may be configured to acquire instructions on the applicable authorization procedures 403a from PS XDMS 301 via Communication Unit 401, e.g. in case the instructions are configured as a part of the Presence rules associated with the Presentity, and to store acquired instructions on a memory means 405 of PS 300. Alternatively, these instructions may initially be stored on the memory means 405. In association with acquiring the instructions, PS 300 will also be able to access the applicable authorization rule. According to known Presence applications, authorization rules are stored on and accessible from a PS XDMS. According to the suggested solution, PS 300 will be made aware of the relevant authorization rule via any of the suggested notifications, and the updated authorization rule may also be stored on and accessible by the authorization unit 402 from the memory means 405. The Authorization Unit 402 may typically also be configured to acquire access rights from PS XDMS 301, which are indicating which Authorization Instances 407 that are entitled to update authorization rules, such as authorization rule 304b, of Presentity (P).

The authorization unit 402 may be configured to acquire the access rights 404 of a Presentity in association with receiving a request for subscription of Watcher info/XCAP Changes, in order to determine whether to accept or reject the subscription request. The instructions 403a and access rights 404 may be provided as separate documents, or as a single document. Under any circumstances instructions 403a applicable for Presentity (P) may comprise links to authorization rules that have been specified for a Watcher, as well as links to the access rights applicable for the Presentity.

The authorization arrangement 400 also comprises a notification unit 405, which is configured to generate notifications, such as e.g. a Watcher Info SIP NOTIFY, for transmission to Authorization Instances 407 via Communication Unit 401 and to recognise notifications indicating a change of an authorization rule, which are sent from PS XDMS 406, and received by the communication unit 401.

On the basis of the acquired instructions, in combination with any notification received and recognized by the Notification Unit 405, Authorization Unit 402 is configured to determine whether an authorization rule 304b can be verified or not, such that a notification on a final decision on the authorization of the request for presence information can be made, or if the instructions for the authorization rule specify that yet another authorization instance has to be notified before a final decision can be made. The authorization rules may be configured as separate documents, where, upon update of a rule one document can override another, all depending on level of authority.

Figure 5:
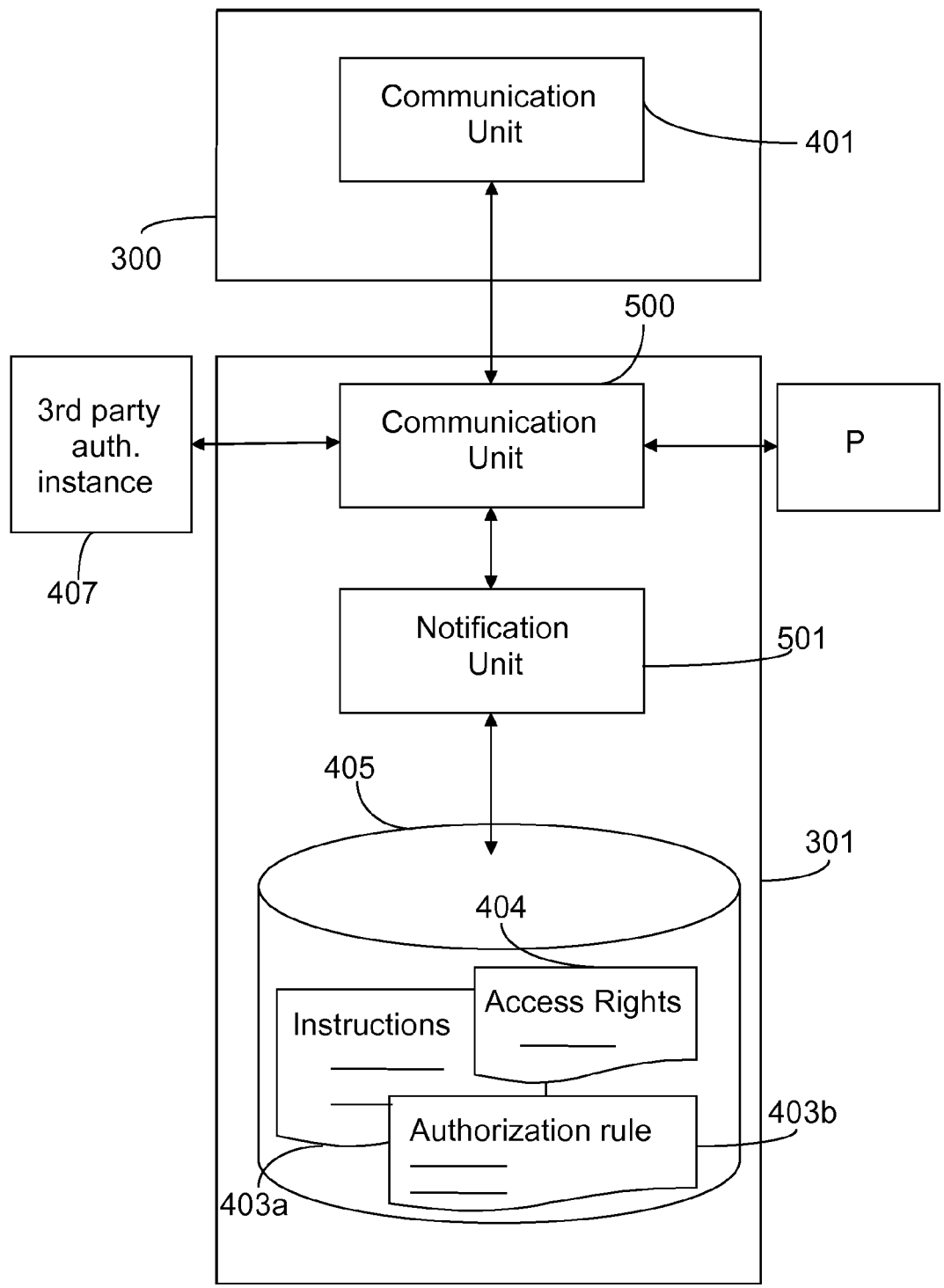
FIG. 5 is a simplified block scheme illustrating an exemplified PS XDMS, being part of a Presence system, such as the one described with reference to FIG. 4.

A simplified illustration of functional unit of a PS XDMS 301, connected to or being an integrated part of a PS 300 will now be described with reference to FIG. 5. It is to be understood that the described PS XDMS 301 constitutes a conventional PS XDMS, which in the present context will be able to store instructions 403a, authorization instructions 403b and access rights 404, as part of Presence rules or as one or more separate documents in a storage means 502. Communication unit 500 provides Presentities and third party authorization instances access to the PS XDMS 301, while a notification unit 501 is configured to generate XCAP Changes notifications to these entities, according to any approved subscriptions.

In addition, PS 300 may be provided with a timer functionality 406. Since an authorization unit being notified by the PS or PS XDMS may choose not to participate in an ongoing authorization process, the authorization unit 402 may be configured to start a timer function in association with notifying an authorization instance. If a notification indicating an authorization rule update is recognized by the authorization unit 402 prior to timing out of the timer, the update will be considered for the continuing authorization process, while in case no such notification is received by PS 300 prior to timeout, authorization unit 402 is configured to continue the process according to the instructions, e.g. by notifying a further authorization instance, or by making a final authorization decision based on pre-defined default instructions, which are applicable for the request.

It is to be understood that since procedures for approvement of subscription requests as well as procedures for notifying an authorization instance from a PS XDMS are commonly know, these procedures will not be described in any further detail in this document.

While the present invention has been described with reference to exemplary embodiments, the description is generally only intended to illustrate the inventive concept and should not be taken as limiting the scope of the invention, which is defined by the appended claims.

ABBREVIATIONS

3 GPP 3rd Generation Partnership Project
IETF the Internet Engineering Taskforce
IETF SIMPLE the Internet Engineering Taskforce SIP Instant Messaging and Presence Leveraging Extensions OMA Open Mobile Alliance
PS Presence Server
PS XDMS Presence Sewer XML Document Management Sewer
RCS Rich Communication Suite
SIP Session Initiation Protocol
W info Watcher information
XCAP Extension Markup language Configuration Access Protocol
XMPP Extension Messaging and Presence Protocol
XML Extension Markup language

The invention claimed is:

1. A method in a Presence System for authorizing a Watcher to access Presence information associated with a Presentity, the method comprising the following steps:
   a) receiving from the Watcher a request for said Presence information;
   b) acquiring instructions indicating that an authorization instance other then the Presentity shall be given an opportunity to change or verify an authorization rule associated with the request for presence information;
   c) notifying the authorization instance of the request for presence information, thereby enabling the authorization instance to change or verify the authorization rule, and
   d) making a final decision on the authorization rule on the basis of the instructions and a notification indicating a change or a verification of the authorization rule, in case such a notification is received from the authorization instance, or on the basis of a default authorization rule of the instructions, in case no such notification is received, wherein repeating step c) for at least one additional authorization instance other than the Presentity according to the instructions, before executing step d) and the order of authorization instances is determined on the basis of an authority list being included in the instructions, such that the authorization instance being appointed the highest authority is notified first.

2. The method according to claim 1, comprising the further steps of:
   starting a timer in response to notifying an authorization instance in step c), and
   repeating step c) for another authorization instance in case a notification of a set, changed or verified authorization rule is received in response to the notification of the authorization instance (C, D, E, P) prior to timeout of the timer or upon timeout of the timer.

3. The method according to claim 1, wherein said repeatable steps are repeated until the authorization instance having the highest authority has responded to a notification or the timer associated with this authorization instance has timed out.

4. The method according to claim 1, wherein step c) is first executed for Presentity representing an authorization instance, before executing step c) for an authorization instance other than Presentity.

5. The method according to claim 1, wherein step c) is first executed for the authorization instance other than authorization instance before executing step c) for Presentity representing an authorization instance.

6. The method according to claim 1 wherein the authorization rule is updated according to the instructions being defined in presence rules of the Presence System.

7. The method according to claim 1, wherein the notification which is sent in step c) comprise an indication that Watcher is requesting Presence information associated with Presentity and information about what kind of Presence information Watcher (W) is requesting.

8. The method according to claim 1, wherein the identities of the Watcher and the Presentity is included in any of: the To header, From header or notification body of the notification which is sent in step c).

9. The method according to claim 1, wherein the identities of the Watcher and the Presentity is included in a new identity header of the notification which is sent in step c).

10. The method according to claim 1, comprising the further steps of:
    receiving from the authorization instance a request for subscribing for Watcher information or updates of the authorization rule,
    determining whether the authorization instance from which the request for said subscribing is received is authorized to set, change or verify the authorization rule, and
    notifying in step c) an authorization instance which is authorized to set, change or verify the authorization rule.

11. The method according to claim 10, wherein the determination step is determined on the basis of the access rules of the Presentity.

12. The method according to claim 10, wherein the notification of step c) is provided as a Watcher Info NOTIFY message, in case the authorization instance has requested for a subscription of Watcher information.

13. The method according to claim 10, wherein the notification of step c) is provided as an XCAP Changes NOTIFY message, in case the authorization instance has requested for a subscription of updates of the authorization rule.

14. A Presence System for authorizing a Watcher to access Presence information associated with a Presentity, the Presence System comprising:
    a communication unit for receiving from the Watcher a request for said Presence information;
    an authorizing unit for acquiring instructions indicating that an authorization instance other then the Presentity shall be given an opportunity to set, change or verify an authorization rule associated with the request for presence information;
    a notifying unit for notifying the authorization instance of the request for presence information, thereby enabling the authorization instance to set, change or verify the authorization rule,
    the authorizing unit being further configured to make a final decision on the authorization rule on the basis of the instructions and a notification indicating a setting, change or a verification of the authorization rule, in case such a notification is received from the authorization instance, or on the basis of a default authorization rule of the instructions, in case no such notification is received, and wherein the authorization unit is configured to control the notifying unit such that the notification of an authorization instance is repeated for at least one additional authorization instance other than the Presentity according to the instructions, before the final decision is taken by the authorization unit.

15. The Presence system according to claim 14, further comprising a timer unit, wherein the authorization unit is further configured to start a timer upon instructing the notification instance to notify the authorization instance, and to, according to the instructions, take the final decision or to instruct the notification unit to notify another authorization instance and to start another associated timer in case a notification of a changed or verified authorization rule is received by the communication unit in response to the notification of the authorization instance prior to or upon time-out of the timer.

16. The Presence system according to claim 14 wherein the authorization unit is configured to repeat the notifications of authorization instances until the authorization instance having the highest authority has responded to a notification or the timer associated with this authorization instance has timed out.

17. The Presence system according to claim 14, wherein the authorization unit is configured to instruct the notification unit to notify Presentity representing an authorization instance, before an authorization instance other than the Presentity is notified.

18. The Presence system according to claim 14, wherein the authorization unit is configured to instruct the notification unit to notify an authorization instance other than Presentity before notifying Presentity representing an authorization instance.

19. The Presence system according to claim 14 wherein the authorization unit is configured to update the authorization rule according to the instructions being defined in presence rules of the Presence System.

20. The Presence system according to claim 14, wherein the notification unit is configured to add to a notification which is to be transmitted to an authorization instance an indication indicating that Watcher is requesting Presence information associated with Presentity and information about what kind of Presence information Watcher is requesting.

21. The Presence system according to claim 14, wherein the notification unit is configured to add to the notification which is to be transmitted to the authorization instance identities of the Watcher and the Presentity, wherein the identities are included in any of: the To header, From header or notification body of the notification.

22. The Presence system according to claim 14, wherein the notification unit is configured to add to the notification to the authorization instance identities of the Watcher and the Presentity, wherein the identities are included in a new identifications header of the notification.

23. The Presence system according to claim 14, wherein the authorization unit is further configured to:
receive from the authorization instance a request for subscribing for Watcher information or updates of the authorization rule,
determine whether the authorization instance from which the request for said subscribing is received is authorized to change and/or verify the authorization rule, and to instruct the notifying unit to
notify the authorization instance if it is found that it is authorized to change and/or verify the authorization rule.

* * * * *

UNITED STATES PATENT AND TRADEMARK OFFICE
CERTIFICATE OF CORRECTION

Page 1 of 2

PATENT NO. : 8,898,744 B2
APPLICATION NO. : 13/574696
DATED : November 25, 2014
INVENTOR(S) : Boberg et al.

It is certified that error appears in the above-identified patent and that said Letters Patent is hereby corrected as shown below:

On the title page, item (75), under "Inventors", in Column 1, Line 3, delete "Alvsjo" and insert -- Älvsjö --, therefor.

In the specification

In Column 1, Line 58, delete "transmit" and insert -- transmits --, therefor.

In Column 1, Line 63, delete "transmit" and insert -- transmits --, therefor.

In Column 2, Line 3, delete "transmit" and insert -- transmits --, therefor.

In Column 2, Line 56, delete "to set" and insert -- to set, --, therefor.

In Column 3, Line 25, delete "the n" and insert -- then --, therefor.

In Column 6, Line 8, delete "info. which" and insert -- info, which --, therefor.

In Column 6, Line 40, delete "Watchers" and insert -- Watcher's --, therefor.

In Column 7, Line 18, delete "Ata" and insert -- At a --, therefor.

In Column 7, Line 61, delete "IF," and insert -- If, --, therefor.

In Column 9, Line 15, delete "transmit" and insert -- transmits --, therefor.

In Column 9, Line 45, delete "IF" and insert -- If --, therefor.

In Column 11, Line 11, delete "unit," and insert -- units, --, therefor.

Signed and Sealed this
Twenty-fourth Day of November, 2015

Michelle K. Lee
*Director of the United States Patent and Trademark Office*

CERTIFICATE OF CORRECTION (continued)
U.S. Pat. No. 8,898,744 B2

In the specification

In Column 12, Line 23, delete "unit" and insert -- units --, therefor.

In Column 12, Line 51, delete "that" and insert -- that, --, therefor.

In Column 13, Line 3, delete "Presence Sewer" and insert -- Presence Server --, therefor.

In Column 13, Lines 3-4, delete "Management Sewer" and insert -- Management Server --, therefor.